United States Patent [19]

Kannapell

[11] 4,164,399

[45] Aug. 14, 1979

[54] WET SCRUBBING DEVICE

[75] Inventor: David H. Kannapell, Prospect, Ky.

[73] Assignee: American Air Filter Company, Inc., Louisville, Ky.

[21] Appl. No.: 837,359

[22] Filed: Sep. 28, 1977

[51] Int. Cl.² .................. B01D 47/06; B01D 47/12
[52] U.S. Cl. .......................... 55/223; 55/240; 55/249; 261/77; 261/114 R; 261/DIG. 44
[58] Field of Search ............... 55/223, 224, 240, 241, 55/244, 249; 261/77, 111, 114 JP, 114 R, 121 R, DIG. 44

[56] References Cited

U.S. PATENT DOCUMENTS

| | | | |
|---|---|---|---|
| 1,741,519 | 12/1929 | Huff | 261/77 |
| 2,070,578 | 2/1937 | Bowman | 55/223 |
| 3,532,595 | 10/1970 | Arnesjo et al. | 55/223 |
| 3,667,920 | 6/1972 | Koref et al. | 261/77 |
| 3,765,659 | 10/1973 | Reilly | 55/240 |
| 3,807,143 | 4/1974 | Dunn | 55/244 |

FOREIGN PATENT DOCUMENTS

| | | | |
|---|---|---|---|
| 156106 | 9/1956 | Sweden | 261/121 R |
| 485155 | 5/1938 | United Kingdom | 55/223 |

Primary Examiner—Frank W. Lutter
Assistant Examiner—David L. Lacey
Attorney, Agent, or Firm—Jon C. Winger

[57] ABSTRACT

A wet scrubbing device having a transversely extending trough mounted in a vertically extending scrubbing tower with means to add a scrubbing solution to the trough and means to pressurize the fluid in the trough forcing the scrubbing solution out of the trough in spray or sheet form.

6 Claims, 3 Drawing Figures

WET SCRUBBING DEVICE

BACKGROUND OF THE INVENTION

1. Field of the Invention

This invention relates to improvements in contacting means between a gas and a liquid in a wet scrubbing tower and more particularly relates to improvements in scrubbers for removing sulfur dioxide from a gas stream passing through the scrubber.

2. Discussion of the Prior Art

In the processing of waste gases containing particulate materials therein, as well as chemically reactive substances, it is a commonly accepted practice to remove these undesirable materials by passing the waste gas through a scrubbing tower. The scrubbing towers generally contain water or chemically reactive solutions therein to react with or absorb the undesirable materials in the gas stream as the gas passes through the scrubbing tower. Particularly in the case of the removal of oxides of sulfur from the burning of coal in utility plants and the like, in order to remove these undesirable oxides from the waste gas stream, many different types of scrubbing devices have been devised. In most cases chemical solutions containing alkaline or similar compounds which react with these oxides of sulfur to form soluble sulfites and sulfates have been proposed for use in scrubbing towers. The most commonly used scrubbing devices include complex baffle means within the scrubbing zone of the tower to promote liquid-gas contact or contact elements in the form of stationary or floating beds are used wherein the cleaning solution coats the elements and as the gas passes through the beds the oxides of sulfur come in contact with the scrubbing solution on the contact elements. However, in both types of the aforementioned devices large amounts of energy are used for forcing the gases through the devices as well as for pumping of the chemical reacting spraying solutions to spray nozzles in the scrubbing device. Furthermore, the design of these scrubbing devices have been found to be complex and quite expensive in order to obtain satisfactory removal of the oxides of sulfur from a waste gas stream.

Several devices are known in the prior art for scrubbing dirty gases utilizing troughs or baffles therein to form sheets of cleaning liquid through which a gas to be cleaned comes in contact. These include, for example, those described in U.S. Pat. Nos. 3,350,076; 3,656,279; 3,392,967; 3,895,926; 3,799,572; 3,550,356; and 3,533,608.

SUMMARY OF THE INVENTION

In the present invention it has been found desirable to provide a wet scrubbing device which minimizes the amount of energy required for adding a scrubbing solution to a scrubbing tower while maintaining a high rate of absorption of oxides of sulfur.

In the present invention, scrubbing solution from a scrubbing solution source is pumped to horizontal troughs disposed within the scrubbing zone of a wet scrubbing device. These troughs are so aligned that when they are filled and overflowing, sheets of scrubbing solution cascade from trough to trough so that a gas to be cleaned must pass through these sheets of solution as it moves from the inlet to the outlet of the scrubbing device. Preferably, in order to maximize the use of energy from the incoming waste gas stream, a portion of the waste gas is in communication with the troughs thereby causing both intimate contact and violent reaction with the slurry in the trough so the solution overflowing the trough is also sprayed therefrom. In this type of device, spray nozzles for the reacting solution are not necessary in order to obtain a uniform spray across the scrubbing device. Thus, plug-up of nozzles which is a constant problem in many types of scrubbing devices is not possible. Furthermore, by utilizing some of the energy from the incoming waste gas stream to pipe waste gas directly into the troughs, the aforementioned intimate contact and reaction with the spraying solution is obtained.

Various other features of the present invention will become obvious to those skilled in the art upon reading the disclosure set forth hereinafter.

More particularly, the present invention provides a wet scrubbing apparatus comprising: a scrubber having a flow-through inlet and a flow-through outlet; a transversely extending trough mounted within the housing between the flow-through inlet and the flow-through outlet; means to add a scrubbing solution to the trough; and, means to force the solution out of the trough.

It is to be understood that the description of the examples of the present invention given hereinafter are not by way of limitation. Various modifications within the scope of the present invention will occur to those skilled in the art upon reading the disclosure set forth hereinafter.

BRIEF DESCRIPTION OF THE DRAWING

Referring to the drawing.

DESCRIPTION OF THE PREFERRED EMBODIMENT

Figure 1:
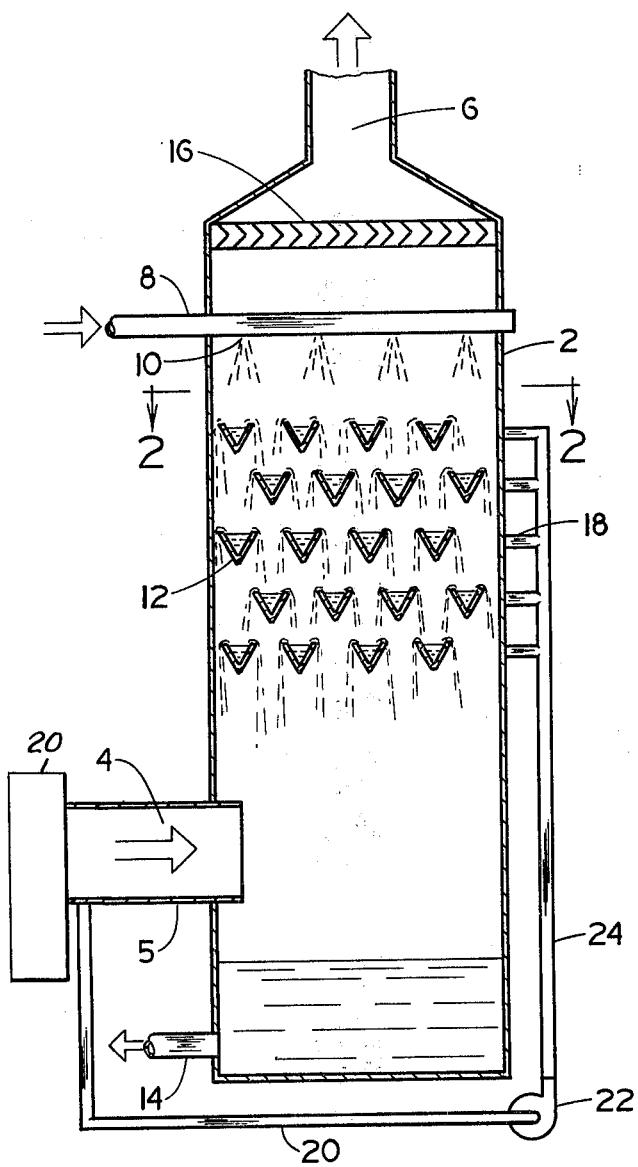
FIG. 1 is a vertical sectional view of a wet scrubbing apparatus of the present invention.
Figure 3:
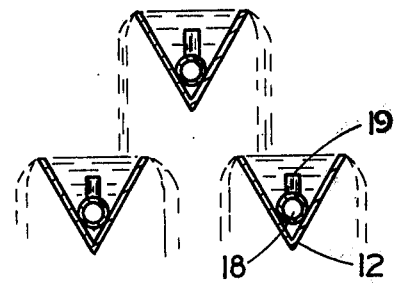

FIG. 1 of the drawing illustrates a preferred structure of a wet scrubbing apparatus of the present invention. The wet scrubbing apparatus of the present invention includes a wet scrubbing tower 2 having a flow-through inlet 4 in the bottom thereof and a flow-through outlet 6 in the top thereof. The flow-through inlet 4 is in fluid communication with a waste gas source (not shown) and the flow-through outlet 6 is either open to the atmosphere or in fluid communication with other process cleaning or treating devices (not shown).

The scrubbing tower 2 is also provided with at least one opening in the top thereof to receive a cleaning solution conduit 8 therethrough. As shown, conduit 8 extends through opposed openings in the scrubbing apparatus 2 and is supported by the vertically extending walls or shell of the tower 2. Conduit 8 is in flow communication with a cleaning solution source (not shown) which may be water or a chemical reactive solution make-up tank for supplying a specific chemical solution to the scrubber to react with chemically reactive substances in the gas stream passing through the tower 2. Conduit 8 is provided with a plurality of openings 10 therein to supply cleaning solution to the tower 2. Openings 10 are spaced at preselected locations so as to supply solution substantially uniformly across the tower 2 to troughs 12, to be discussed hereinafter.

The scrubbing tower 2 is even further provided with an opening in the bottom thereof to receive a dirty solution discharge conduit 14 therethrough. Discharge conduit 14 is in flow communication at one end with the solution build up in the bottom of the scrubber 2 from the reaction of the cleaning solution and the contaminants in the gas stream; and, a waste solution receiving means (not shown) at the opposite end.

A mist eliminator 16 is generally provided within the tower 2 at the top thereof and downstream of the outlet 6 to remove entrained liquid in the cleaned gas stream before the cleaned gas leaves the unit. The mist eliminator 16 may be any known in the art and may be mounted in any manner desired.

Figure 2:
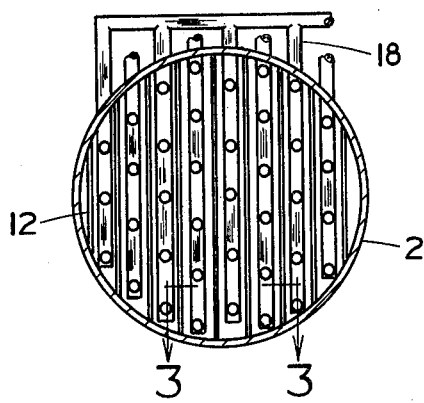
FIG. 2 is a plan view of the wet scrubbing device of FIG. 1 as seen if viewed along line 2—2 in FIG. 1; and, FIG. 3 is an enlarged sectional view of the troughs in FIG. 2 as seen if viewed along line 3—3 in FIG. 2.

Disposed within the tower 2 is a plurality of horizontally aligned rows of troughs 12 with troughs 12 in alternating rows being in vertical alignment. Adjacent rows of the troughs 12 are spaced so that upon filling the troughs 12 to overflow capacity, the overflow forms sheets of liquid cascading from trough to trough as the liquid flows downward through the tower 2. As best shown in FIG. 2, the troughs 12 extend substantially across the tower 2 and are spaced so substantially all of the gas passing through the tower 2 must pass through the cascading liquid. Furthermore, opposed ends of troughs 12 are fixedly attached, usually by welding, to the inner walls of the tower 2.

However, it is realized that the troughs 12 may be attached and supported by other well known means without departing from the scope and spirit of the present invention. Furthermore, the troughs 12 of the present invention are shown as being V-shaped in cross-section, but it is realized that other shapes may be utilized without departing from the scope and spirit of the present invention.

Disposed longitudinally along the bottom of the troughs 12 are conduits 18 through which a pressurizing fluid passes for atomizing or bubbling the solution in the troughs 2 through a plurality of spaced atomizing nozzles 19. Conduits 18 are in fluid communication with a pressurized fluid source and as shown in FIG. 1, the pressurized fluid is the waste gas entering the scrubbing tower 2 from a source 20 of waste gas such as, for example, a coal burning furnace.

In FIG. 1, the pressurized fluid system for atomizing or bubbling the solution in the troughs 12 includes a conduit 20 in fluid communication with waste gas conduit 5 which feeds the waste gas to the scrubber 2 through inlet 4 at one end and a blower 22 at the other. Blower 22 discharge is connected in fluid flow relation to conduit 24 which is in turn in flow communication with a plurality of the parallel conduits 18.

In the operation of the preferred device, waste gas from a waste gas source enters the scrubber 2 through conduit 5 and flow-through inlet 4, a small portion of the waste gas being removed from conduit 5 and blown into the troughs 12 through the conduits 18 and atomizing nozzles 19. Simultaneously therewith, cleaning solution through conduit 8 enters the top of the unit and is sprayed downwardly through the preselected spaced openings 10 in vertically aligned troughs 12. Troughs 12 are spaced so that all of the waste gas passing through the scrubber must pass through the liquid cascading downwardly from trough to trough.

It is noted that in the preferred device, pressurizing fluid for the troughs is a portion of the waste gas passing through the unit. However, it is realized that for some applications other pressurizing fluids may be utilized for forcing the solution out of the troughs.

It will be realized that various other changes may be made to the aforedescribed device without departing from the principals of the present invention.

What is claimed is:

1. A wet scrubbing apparatus for cleaning a waste gas comprising:
a scrubber housing having a flow-through inlet and a flow-through outlet; a plurality of transversely extending troughs mounted within said housing between said flow-through inlet and said flow-through outlet, said plurality of troughs equally spaced in a plurality of horizontally aligned rows with alternating rows being vertically aligned and said troughs in adjacent rows being spaced equidistant between said troughs of adjacent rows; means to add a scrubbing solution to said troughs; and, means to force said scrubbing solution out of said troughs including a first conduit disposed along the bottom of each of said troughs with spaced preselected openings therein in fluid communication with a pressurized fluid source so that the scrubbing solution overflowing from row to row of said troughs creates fluid sheets caught by said troughs in rows adjacently below overflowing troughs, whereby the waste gas to be cleaned must pass through the liquid sheets of scrubbing solution as the waste gas to be cleaned passes through said housing from said flow-through inlet to said flow-through outlet.

2. The wet scrubbing apparatus of claim 1 wherein said each of troughs is of V-shaped cross-section.

3. The wet scrubbing apparatus of claim 1, said openings in said first conduit having upwardly extending nozzles therein.

4. The wet scrubbing apparatus of claim 1, further comprising: a second conduit in flow communication at one of its ends with said first conduits and at its opposite end with a pressurizing device, and a third conduit in flow communication at one of its ends with said flow-through inlet and at its opposite end with said pressurizing device whereby a portion of a waste gas flowing through said flow through inlet flows through said third conduit, said pressurizing device, said second conduit, said first conduits and out through said openings in said first conduits to force the scrubbing solution out of said troughs.

5. The wet scrubbing apparatus of claim 4, said pressurizing device being a blower.

6. The wet scrubbing apparatus of claim 1, said scrubber housing extending vertically, said trough extending horizontally.

* * * * *